United States Patent [19]
Grossman

[11] 4,184,749
[45] Jan. 22, 1980

[54] WIDE ANGLE NARROW BANDPASS OPTICAL FILTER SYSTEM

[75] Inventor: Jack J. Grossman, Manhattan Beach, Calif.

[73] Assignee: McDonnell Douglas Corporation, Long Beach, Calif.

[21] Appl. No.: 918,160

[22] Filed: Jun. 22, 1978

[51] Int. Cl.$^2$ ............................ G02B 3/00; G02B 5/28
[52] U.S. Cl. ..................................... 350/195; 250/216; 350/165; 350/166; 350/175 SL; 350/198; 350/199; 350/207; 356/416
[58] Field of Search .................. 350/175 SL, 175 TS, 350/195, 206, 207, 208, 196, 199, 198, 165, 166; 356/416

[56] References Cited
U.S. PATENT DOCUMENTS 3,278,752  10/1966  Brixner ........................... 350/208 X

*Primary Examiner*—Paul A. Sacher
*Attorney, Agent, or Firm*—Henry G. Kohlmann; Walter J. Jason; Donald L. Royer

[57] ABSTRACT

A spherical lens element and a concentric lens element receive light, in that order, from a wide field of view, and diverge all rays so that upon leaving said concentric element, the angles of all rays approximate that of radial lines. This light is then filtered through a concentric narrow bandpass filter to attenuate undesired background light, and is collected by a suitable light collector and detector. Apertures for selecting the field of view and F number are provided.

31 Claims, 4 Drawing Figures

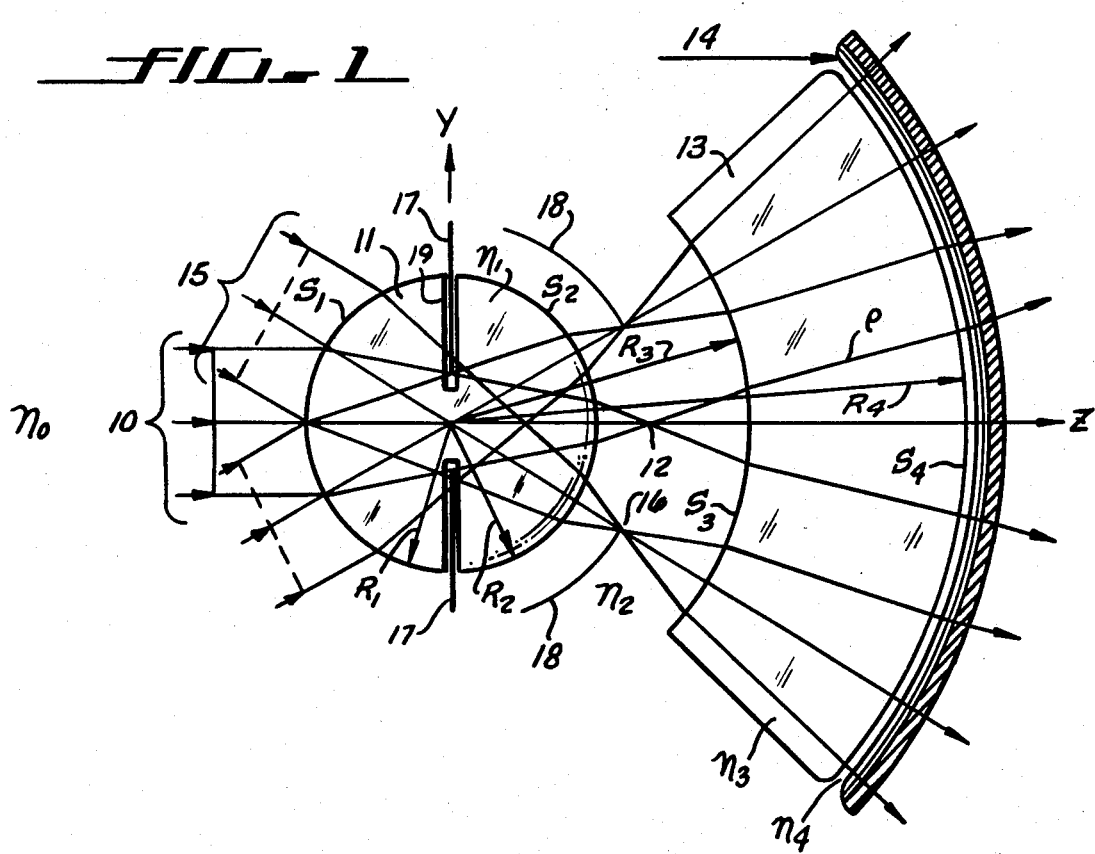
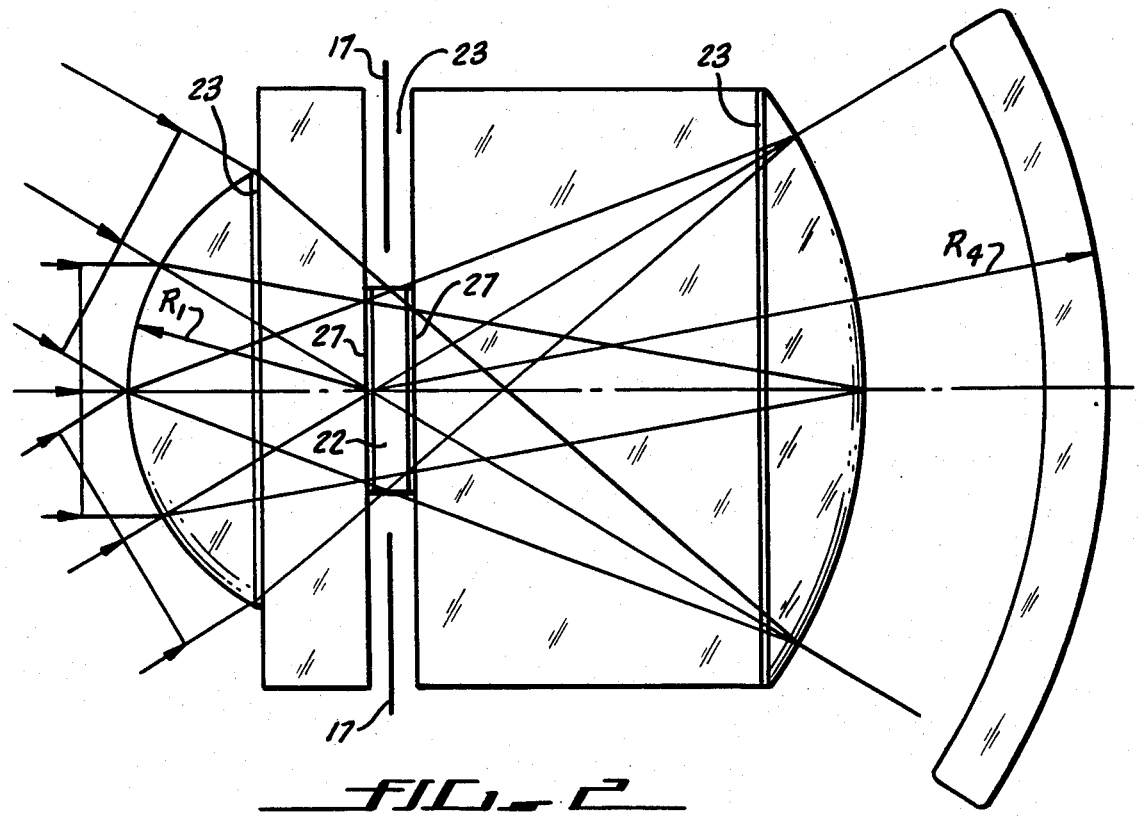

WIDE ANGLE NARROW BANDPASS OPTICAL FILTER SYSTEM

BACKGROUND OF THE INVENTION

The described apparatus is an optical system for collecting and filtering light rays being received at wide cone angles and, more particularly, comprises a spherical lens, concentric lens and filter elements for accomplishing this function.

Typical laser optical systems in use assume that the received light will be singularly collimated; that is, will arrive at the lens by transversing a straight line from the point of origin. This assumption is not always applicable in laser communications or laser radar systems where scattered rays might require collection from wide cone angles. One example would be a laser communication link between an underwater observer such as a diver or the like and his support ship or aircraft.

In this case, because of wave action and because of the high hydrosol or suspended particulate concentrations in sea water, scattering occurs so that the light energy from a point source is received by the submerged observer at a plurality of angles. Similarly, ship to ship transmission through fog results in a scattering of the laser light at a plurality of angles. In both cases a wide angle receiver is required.

Further, the underwater observer may not know the location of the aircraft or support vessel, and would be required to open the field of view to take in light from an even wider angle. Of course, as the field of view is increased an increased amount of background light is also received and tends to mask the communication signal even more than at the optimum field of vision, F.O.V. In any event it is necessary then to filter the admitted or received light in a narrow spectral band about the signal band to discriminate the desired signal. Such filtering could be accomplished by the combination of a wide band semiconductor such as $GaAs_xP_{(1-x)}$ in the near infra-red range and crystal mixtures of ZnS, ZnSe, and ZnTe in the visible to act as long wavelength bandpass filters in combination with a dye absorption band to act as a low pass filter, the combination producing a narrow band filter. The difficulty with these systems is that they each require a material development project to tailor a filter to each wavelength selected. That is, if a particular semiconductor and dye combination can be found at one wavelength its tuning range is limited and another different semiconductor dye combination is necessary for each laser line chosen. A more cost effective solution would be to use dielectric interference filters where proper tuning is accomplished by simply varying the deposition time. Dielectric filters although nominally priced are, however, spectrally inefficient unless the received light impinges on the filter surface at substantially right angles thereto. More specifically, spectral bandwidths of one nm with transmission efficiencies of fourty percent are routine. However, when part of the signal beam is not perpendicular to the interference surface, the apparent maximum transmission wavelength increases with increasing angle of incidence.

A solution is to design an optical system to be used either with ordinary light or lasers which would have a wide field of view and a narrow dielectric bandpass filter with some decrease of spatial resolution in the spherical image plane.

SUMMARY OF THE INVENTION

The inventive apparatus comprises a spherical lens and concentric lens and filter elements. Where light input to the lens has been scattered prior to reception, it is convenient to think of the incoming light as composed of a plurality of collimated beam groupings angularly disposed from one another impinging on the lens over a wide cone angle which can exceed 60°. This plurality of beam groupings is focused through the spherical lens to a plurality of points behind the lens. As the light diverges from these image points, the light is intercepted by a concentric lens element. The spacing of the concentric element with relation to the spherical lens and image points is such that the light leaves the concentric element at an angle very closely approximating a radial line from concentric center regardless of the original angle at which the light was received.

A concentric dielectric filter element next receives the light, and efficiently filters it since at all points and for all rays, the light falls on the filter at an angle of incidence approximating 90°. Because a narrow dielectric bandpass filter can be used under these circumstances, the filter can discriminate effectively between the desired laser or optical light input and undesired background light outside the desired spectral range. The output light from the filter can then be examined by a plurality of detectors or concentrated onto a central collection point or otherwise processed by the remainder of the receiver or optics detector.

The general characteristics of this system, therefore, are that it can collect a large amount of light over a variable input angle, and can discriminate narrowly between the desired signal and undesired background light. Thus, the range and reliability of the communication system can be increased significantly through the use of this inventive apparatus.

Minimal system parameters for this system are a maximum field of view of 60°, a tuneable spectral range of between 480 nm and 530 nm, with a bandwidth of 0.5 nm to 1 nm or greater and f-number of f2.4 to f48.

BRIEF DESCRIPTION OF THE DRAWINGS

FIG. 1 is a schematic drawing of the filter system showing the spherical and concentric lenses, the filter and the two apertures.

FIG. 2 is an alternate embodiment of a spherical lens.

DETAILED DESCRIPTION OF THE INVENTION

Figure 3:
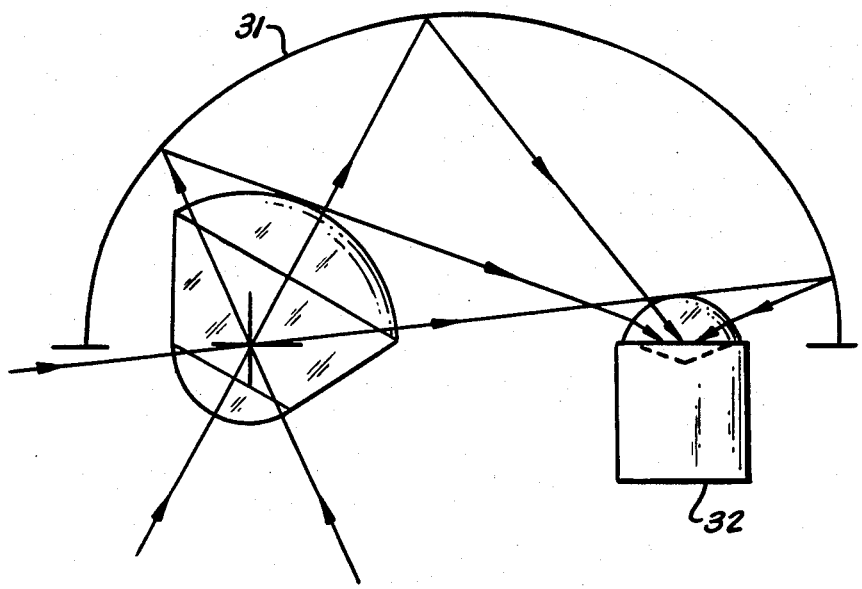
FIG. 3 is a schematic diagram of one collector embodiment.

FIG. 1 is a schematic drawing of the spherical lens and filter used in this system. A collimated light beam 10 is shown entering the spherical lens 11 to be focused at the image point 12. Since the spherical lens is not to be used for imaging scattered light, precision is not required. Thus, the image point is in fact a poor image point in that all the available light from collimated beam 10, for example, is not focused exactly on one point 12. However, this lack of exact focusing does not adversely affect the system. The light passing through image point 12 diverges to intersect the concave inner surface of the concentric lens 13 which refracts all rays in a direction to more nearly align them with the radius lines of a concentric filter 14. As shown in FIG. 1, the result of the refraction of the collimated light beam 10 by the spherical and concentric lenses is that all of the light contained in the original collimated light beam 10 intersects the filter 14 at substantially right angles to the surface thereof.

A second collimated light beam 15 is shown. This beam is identical to beam 10 in all respects except that it is received at a different angle. As in the case of beam 10, the rays of beam 15 will pass through the spherical lens, be focused on a second image point 16 and pass through concentric lens 13 to intersect the filter 14 at approximately right angles.

The characteristics of this arrangement are that a wide angle lens can be used to focus light onto a concentric filter 14 so that the light received by the filter will be received at right angles regardless of the angle of its source.

A groove 19 is provided in spherical lens 11 perpendicular to the axis of the conical field of view for receiving a variable aperture element 17 such that the F number of the lens may be adjusted when it is desirable to improve system performance for known sources of light. For example, if a communication signal is received without scattering in clear weather along the central axis of the system focal plane the aperture may be stopped down to decrease F.O.V. in the focal plane 12 and 16 and limit background noise. Therefore, under such conditions, system performance is improved.

The system also can be made to select the field of view by the inclusion in the system of a variable field of view aperture 18 which is a concentric aperture placed between the spherical lens 11 and concentric lens 13 at a distance corresponding to the location of the plurality of image points 12 and 16. As this field of view aperture 18 is closed about image point 12, it will intersect image point 16 and other image points corresponding to large angles of incidence before it intersects image points in the area of image point 12 which result from light more closely approximating parallel angles to the central axis of the focal plane.

Similarly, if there is minimal light scattering and little attenuation of the light from the source and the source position is generally known, the field of view aperture may be translated circumferentially and stopped down about the conical field of view at image points located off the central axis of the focal plane thereby providing a means for selecting a spatially different field of view as well as a more narrow field of view and thereby matching the field of view required by a reduced light scattering.

Thus, not only is a means for narrow discrimination provided but in a sense a means for directing the view of the lens as well. It is recognized that an alternate embodiment which provides a plurality of fixed apertures may be spaced at selected focal points of the spherical lens to allow the above selection of the field of view as well as stopping down about the conical field of view either on or off the central axis.

The field of view aperture 18 may be used effectively where it is known that a greater field of view is not likely to contain substantially greater signal light than background light.

In other words, where the exact location of the transmitter is known, the field of view aperture 18 may be used to block focal points beyond the angle of scattering of the communicated light. Therefore, in any particular case the field of view aperture may be adjusted so as to receive maximum signal while at the same time minimizing the background noise received.

TABLE 1

| Wavelength Shift $\Delta\lambda$ (at $\lambda = 500$) | Percentage Wavelength Shift | Angle of Incidence |
| --- | --- | --- |
| .05 nm | 0.01% | .81° |
| .5 nm | 0.1% | 2.56° |
| 1.0 nm | 0.2% | 3.62° |
| 2.5 nm | 0.5% | 5.73° |
| 5.0 nm | 1.0% | 8.11° |
| 67.0 nm | 13.4% | 30.00° |

The importance of having the maximum possible amount of light intersect the filter at right angles is shown in Table 1 which relates change in dielectric filter wave length maximum as a function of angle of incidence. This table assumes a laser wave length of 500 nm (blue-green). Table 1 shows that as the angle of incidence increases from near 0° to 30° a shift in the wavelength passed by the dielectric filter of 67 nm. Therefore, using a filter with a large enough bandpass to accept a plus or minus 30 degree field of view of information signal would be equivalent to using one with a noise bandpass of ±67 nm. This is wider than the blue-green band of interest for underwater propagation, as in the case of an underwater observer. The purpose of the instant apparatus, then, is to collect light falling on the input spherical surface such that all rays of interest are either perpendicular or nearly perpendicular to the filter surface so as to discriminate over a narrow bandwidth. This is the necessary condition for successfully using a multilayer dielectric filter, or any other interference type filter to collect and detect the transmitted energy over a narrow band of interest.

One form of input optics is shown in FIG. 1. It consists of a sphere with radius $R_1 = R_2$ and a segment of a concentric spherical lens 13 whose radii and $R_3$ and $R_4$. In the specific case shown, the refractive indices of the lenses are equal, $n_1 = n_3$, the refractive indices everywhere else are the same, $n_0 = n_2 = n_4$, and the ratio $n_1/n_0$ less than or equal to 2.0 is necessary to insure focal points outside the spherical lens 11, although any particular ratio may be used in a given lens structure so long as focal points are created at the aperture 18.

We assume a plane wave is incident on the front surface ($S_1$) converges the entering wave into a conveying cone. The rays are converged more strongly at the second surface ($S_2$) and form a poor focus along the central axis of said cone. Beyond the crossover, the rays diverge and the next surface $S_3$ decreases the divergence of each cone shifting the real focal points towards the common center of the concentric spherical surfaces. As any selected cone progresses farther from this common center the angle between any ray and the radius vector $R_4$ to that point becomes progressively smaller.

Therefore, as the difference in the length of the radii $R_3$ and $R_4$ increases, all rays passing through the lens 13 will impinge on a dielectric filter 14 at substantially normal angles to the surface thereof.

A spherical filter is selected because of the ease of manufacture thereof as contrasted with that of planar filters. For example, a spherical filter may be conveniently manufactured by evaporating the filter material onto the inner surface of a hollow spherical glass shell. A specified amount of material is positioned at the inner surface of the sphere, which, of course, is surrounded by the remainder of the inner surface of the hollow shell, deposition of material will be accurately and uniformly deposited over the entire inner surface. In planar construction a uniform evaporation environment over the entire surface is more difficult to obtain since the deposition rate varies with distance from the source for planar applications, while the same does not hold true for spherical deposition wherein a uniform coating is obtained. This requires more equipment and therefore is more costly than the spherical variety. Thus, as opposed to the prior art attempts at combining wide band gap semiconductors and low pass absorbtion filters thus requiring multiple pair combinations for selected wavelengths, bandwidth selection can be determined by single dielectric filter fabrication by simply varying deposition time. The filter could of course be manufactured in multiple segments which provide the same filter function when combined, such a construction is contemplated as being within the scope of this invention. Alternatively, the spherical lens can be manufactured as two spherical segments and connected using an index matching fluid 27 as shown in FIG. 2. Fixed spacers 22 and 23 at the center provide mechanical rigidity. The space diameter of spacer 22 is chosen to be the minimum F number to be used, such that a variable f/stop aperture 17 can be placed between the spherical lens halves whenever a variable aperture is needed, minimizing the volume, weight and cost of lubrication. It is also possible to use two lens halves with different radii of curvature. For example, the front lens can be made larger and increase the collection efficiency while the back lens is kept small to minimize the size of the filter and PMT transfer optics.

When the index of refraction of the propagating medium can be taken as greater than the first lens surface, then a virtual image is formed in front of or inside the first optical element. This is important for applications to underwater communication systems. In this inverted system other geometries are possible including looking into a volume of 360° in aximuth at zenith angles of 45° to 90° instead of 0° to 45°. In all cases, variation of the spherical radii and refractive indices can be used to adjust the light paths to minimize the angle of incidence of all the rays collected.

In FIG. 1 the laser filter can be a multilayer dielectric filter deposited on the surface $S_4$ or better yet, on a concave filter 14 surface concentric with $R_4$. Two advantages of this latter geometry is that the filters are interchangeable and can be fabricated by vacuum deposition using a point source as discussed before. An alternative embodiment of the lens system is shown in FIG. 2. The dielectric filter may be mechanically positioned to alter or set the same concentric with the sphere for proper frequency transfer characteristics by using three piezo-electric positioners at right angles to one another attached thereto. Another type of filter which may be used is the spherical Fabry-Perot here bandwidth is controlled by the mirror finess. In this case, although the finess or bandwidth is fixed, the system can be wavelength tuned by controlling the temperature of the Fabry-Perot. For example, glasses have thermal expansion coefficients of $8 \times 10^{-6}$ cm/°C. If a 10 cm diameter upper segment is heated, the radius expands about 0.4 $\mu$m/°C. By choosing two glasses which have a difference in expansion of 1%, then the change in wavelength is 80 Å/°C. Since maintaining 0.01° C. is within the state-of-the-art, the Fabry-Perot filter can be temperature uned over some 500 Å.

The filtered laser radiation can be collected by a number of techniques and transferred to a detector surface. One scheme is shown in FIG. 3 in which an ellipsoidal mirror 31 is used to refocus the radiation onto as small a detector as possible.

The lens and filter system is positioned at one focal point of mirror 31 such that the light passing through the filter has its virtual source from the focal point. A detector is positioned such that the reflected light passing through the second focal point impinges on the light sent or apparatus contained in the detector. Coupling the radiation to a photomultiplyer (PMT) which has very low noise background even at room temperature is used in one embodiment. Light coupling to the PMT can be improved by using a positive lens coupled to the PMT with an index matching fluid.

Figure 4:
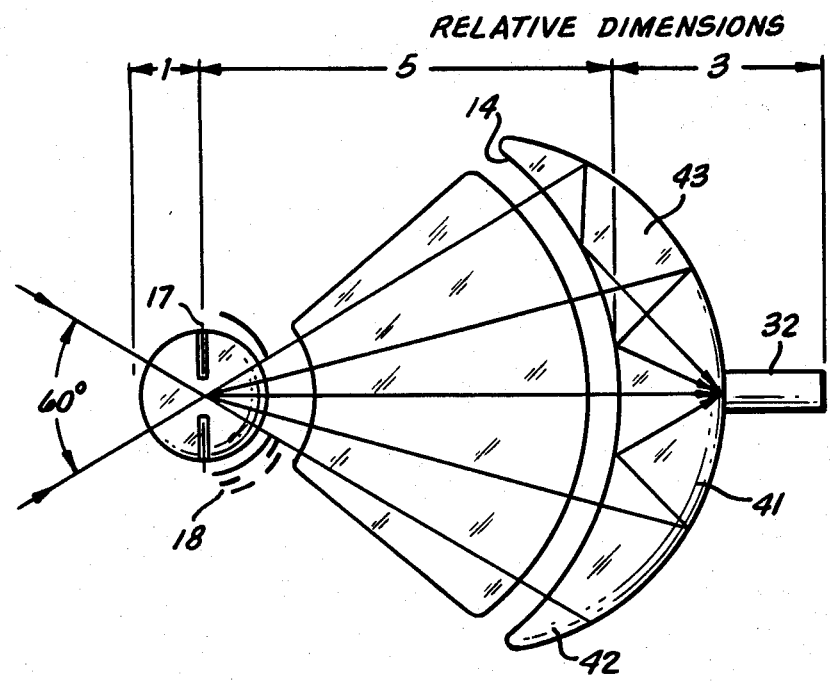
FIG. 4 is a schematic diagram of an alternate collector embodiment.

An alternate embodiment is shown in FIG. 4 where the light is gathered from the filter surface 14 through a collector 43 comprising an outer convex surface 41 which is a 100% mirror, and an inner concave surface which is a 100% mirror, and an inner concave surface which is an interference filter for transmitting the laser wavelength only at 90° angles. Said collector 43 can be either a solid structure or the combination of connected shells. This system is supplied with a field stop aperture 17 and a plurality of field of view apertures 18 as discussed before.

While certain exemplary embodiments of this invention have been described above and shown in the accompanying drawings, it is to be understood that such embodiments are merely illustrative of, and not restrictive on, the broad invention and that I do not desire to be limited in my invention to the specific constructions or arrangements shown and described, since various other obvious modifications may occur to persons having ordinary skill in the art.

What is claimed is:

1. A wide angle narrow bandpass lens and optical filter system comprising:
   a. at least one spherical lens for receiving light at a plurality of angles at the first surface of said spherical lens, and for focusing said light at a plurality of image points outside a second opposite surface of said spherical lens,
   b. at least one concentric lens comprising inner and outer surfaces, all points of each surface equally distant from said spherical lens center, positioned so that said image points are located between said second surface and said inner surface, and
   c. a filter, all points of said filter equally distant from said spherical lens center, positioned so that said concentric lens is located between said filter and said image points.

2. The apparatus of claim 1 wherein said filter is attached to said outer surface of said concentric lens.

3. The apparatus of claim 1
   wherein the centers of said spherical lens, said concentric lens and said filter are positioned in line,
   said spherical lens contains a groove, the plane of said groove being at right angles to said line, and
   further comprising a field stop aperture positioned within said groove adjustable to block a portion of light passing through said spherical lens.

4. The apparatus of claim 1 further comprising a field of view aperture positioned between said spherical lens and said concentric lens to block a portion of light entering said concentric lens.

5. An optical system as described in claim 3 further comprising:
  a. at least one second adjustable aperture positioned at the focal point of said first lens for selectively blocking light transmitted by said first lens whereby light transmitted by said first lens at unwanted angles to the axis of the focal plane may be selectively blocked.

6. An optical system as described in claim 5 wherein said optical filter is attached to the convex surface of said second lens.

7. An optical system as described in claim 6 further comprising:
  a. means for detecting light which passes through said filter.

8. An optical system as described in claim 7 further comprising:
  a. means for collecting the light which passes through said filter, and
  b. means for directing the collected light to said detecting means.

9. An optical system as described in claim 8 wherein said first aperture is planar and said second aperture is a hollow spherical section concentric with said first and second lens.

10. A wide angle narrow bandpass optical filter having elements positioned along a line in the following positional order,
  a first lens element comprising a first surface convex toward a light source defining a spherical surface about a first point on said line, and a second surface convex away from the light source defining a spherical surface about a second point on said line,
  a second lens comprising inner and outer surfaces concentric with said second surface, and
  a filter concentric with said second surface and said inner and outer surfaces.

11. The apparatus of claim 10 wherein said filter is attached to said outer surfaces of said second lens.

12. The apparatus of claim 10 further comprising a field stop aperture means positioned between said first and second surfaces to block a portion of light passing through said first lens element.

13. The apparatus of claim 12 further comprising a field of view aperture means positioned between said second surface and said inner surface.

14. The apparatus of claim 13 wherein said field stop aperture means is adopted to provide a circular field stop aperture centered about and perpendicular to said line, said field stop aperture having a variable radius.

15. The apparatus of claim 14 wherein said field of view operative means comprises an opaque surface concentric to, and located between, said second and inner surfaces having a field of view aperture centered about and perpendicular to said line, said field of view aperture having a variable radius.

16. The apparatus of claim 15 further comprising a detector means for collecting the light passing through said filter.

17. The apparatus of claim 16 wherein said detector means comprises:
  a mirror for reflecting all light passing through said filter onto a generally localized region, and at least one detector located in said region for detecting said light.

18. The apparatus of claim 16 wherein said mirror is ellipsoidal and all light passing through said filter passes through a focal point of said ellipsoidal mirror and said detector is located generally at the opposite focal point of said mirror.

19. An optical lens and filter system for receiving a narrow band width of scattered spectrals signals comprising:
  a. means for collecting light over a wide angle, including at least one first lens for converging light received at a plurality of angles to a plurality of corresponding focal points,
  b. an optical filter, and
  c. means for directing the collected light normal to the surface of said filter, including at least one second lens and wherein said first lens is spherical and said second lens is a hollow spherical section concentric with said first lens.

20. An optical system as described in claim 19 wherein said first lens contains an annular groove parallel to the focal plane thereof and wherein said system further comprises:
  a. a first adjustable aperture received by said groove for varying the ratio of the focal length to the aperture, whereby adjustment of the first aperture changes the f number of the system and allows control of the intensity of light transmitted by said first lens.

21. An optical lens and filter system for receiving and filtering a narrow band width of scattered spectral signals comprising:
  a. a spherical first lens having an annular groove parallel to the focal plane,
  b. an adjustable first aperture received by said groove,
  c. a second lens defining a hollow spherical section concentric with said first lens,
  d. at least one second aperture positioned between said first lens and said second lens and concentric therewith, and
  e. at least one dielectric filter concentric with said second lens.

22. An optical lens and filter system as described in claim 21 wherein the indexes of refraction for said first and second lens are equal and the ratio of the index thereof to the environmental index is 2.0 or less.

23. An optical lens and filter system as described in claim 21 wherein the ratio of the index of refraction of the first lens to the scattering environment is 2 or less.

24. An optical lens and filter system as described in claim 21 wherein the focal length of said first lens terminates at the second aperture.

25. An optical lens and filter system comprising:
  a. a first converging lens for receiving light,
  b. a second converging lens spaced apart from said first lens for directing light received from said first lens toward a focal point,
  c. a third lens concentric with the second lens for receiving the light as it diverges from the focal point and for directing said light toward a radius depending from concentric center, and
  d. a dielectric filter concentric with said third lens for filtering the light transmitted by such lens.

26. An optical system as described in claim 25 further comprising:
  a. at least one adjustable aperture between said second and third lens for limiting the field of view.

27. An optical system as described in claim 26 wherein there are a plurality of adjustable apertures for limiting the field of view along a plurality of axes about the central axis of the focal plane each individually selectable along corresponding axes.

28. An optical system as described in claim 27 wherein said apertures are positioned at the focal point of said second lens.

29. An optical system as described in claim 28 further comprising:
   a. means for detecting light which passes through said filter.

30. An optical system as described in claim 29 further comprising:
   a. means for collecting light which passes through said filter and
   b. means for directing the collected light to said detecting means.

31. An optical system as described in claim 28 wherein said collecting means and said directing means comprises:
   a. an elliptical mirror having the concentric center of the dielectric filter located at one focal point and said detecting means located at the other focal point.